(12) United States Patent
Merrill

(10) Patent No.: US 7,244,124 B1
(45) Date of Patent: Jul. 17, 2007

(54) METHOD AND DEVICE FOR FACILITATING ENERGY PSYCHOLOGY OR TAPPING

(76) Inventor: Barbara Gibson Merrill, 2492 E. Maona Rd., Honolulu, HI (US) 96822

( * ) Notice: Subject to any disclaimer, the term of this patent is extended or adjusted under 35 U.S.C. 154(b) by 845 days.

(21) Appl. No.: 10/604,647

(22) Filed: Aug. 7, 2003

(51) Int. Cl.
*G09B 23/28* (2006.01)
(52) U.S. Cl. ...................................... 434/262
(58) Field of Classification Search ............... 434/236, 434/262, 267, 270, 272, 273; 446/268, 295, 446/296
See application file for complete search history.

(56) References Cited

U.S. PATENT DOCUMENTS

| | | | | |
|---|---|---|---|---|
| 3,858,351 | A * | 1/1975 | Porter | 446/296 |
| 4,075,782 | A * | 2/1978 | Neuschatz | 446/295 |
| 4,288,222 | A * | 9/1981 | Kling | 434/272 |
| 4,762,494 | A | 8/1988 | Woods | |
| 4,822,285 | A * | 4/1989 | Summerville | 434/272 |
| 4,917,607 | A | 4/1990 | Van Hoose | |
| 5,096,424 | A * | 3/1992 | Carlberg | 434/462 |
| 5,199,876 | A | 4/1993 | Waldman | |
| 5,405,266 | A | 4/1995 | Frank et al. | |
| 5,411,437 | A | 5/1995 | Weber et al. | |
| 5,720,502 | A * | 2/1998 | Cain | 283/115 |
| 5,779,483 | A | 7/1998 | Cho | |
| 5,848,900 | A | 12/1998 | Pearson | |
| 5,853,293 | A | 12/1998 | Weber et al. | |
| 6,004,136 | A * | 12/1999 | Ehrenpreis | 434/262 |
| 6,014,973 | A * | 1/2000 | Kaufman | 128/897 |
| 6,077,083 | A * | 6/2000 | Smith-Whitley et al. | 434/262 |
| 6,159,017 | A * | 12/2000 | Coomansingh | 434/267 |
| 6,302,900 | B1 * | 10/2001 | Riggs | 607/89 |
| 6,422,871 | B2 | 7/2002 | Shepherd | |

(Continued)

FOREIGN PATENT DOCUMENTS

GB     2381642     *  5/2003

*Primary Examiner*—Kurt Fernstrom

(57) ABSTRACT

A novel method and device for facilitating that variety of psychotherapeutic technique best known as energy psychology or tapping, but also sometimes referred to as EFT, TFT and meridian therapy, is described. The device is a toy that may take the form of a doll, puppet, animal, or imaginary character, having at least a torso and head. The toy's body parts exhibit markings, visual and/or tactile, appearing as freckles, bumps, dimples, colored fur, warts or the like, that correspond to known meridian and chakra points on the human body. The novel method of the instant invention is administered first by a therapist, parent or other adult teacher knowledgeable in the art of energy psychology or tapping, and later by the subject suffering from a disturbance or uncomfortable feeling. The teacher ascertains the nature and intensity of the subject's disturbance or discomfort, determines the meridian or chakra points, or groups of points, most effective to relieve the identified condition, stimulates by tapping the specific meridian and chakra points, randomly or in a given sequence, and then uses the toy exhibiting markings to teach the subject to self-administer the tapping therapy without the teacher's assistance. Through administration of the tapping therapy upon the subject by the teacher, and later self-administration by the subject without the teacher's assistance, the subject's discomfort, and the underlying psychological disturbance that gave rise to the discomfort, is resolved. The method and device of the instant invention may be used to address negative feelings such as insecurity, anxiety, fear, trauma, anger, helplessness, hurt, pain, sadness, guilt, and shame, and is particularly useful when implementing tapping therapy with children and teens.

7 Claims, 4 Drawing Sheets

U.S. PATENT DOCUMENTS 7,131,989 B2 * 11/2006 Anderer .................. 607/88
2003/0044758 A1 * 3/2003 Ray ...................... 434/267
2004/0161732 A1 * 8/2004 Stump et al. ............ 434/262
2005/0203578 A1 * 9/2005 Weiner et al. ............ 607/2

* cited by examiner

METHOD AND DEVICE FOR FACILITATING ENERGY PSYCHOLOGY OR TAPPING

CROSS REFERENCE TO RELATED APPLICATIONS

There are no related patent applications.

FEDERAL RESEARCH STATEMENT

The subject invention is not the result of or in any way related to federally sponsored research or development.

BACKGROUND OF INVENTION

1. Field of the Invention

The present invention relates to a method and device to address psychological and emotional disturbances and discomfort. In particular, this invention describes a novel toy, and a novel method employing the toy, to facilitate the teaching, application and self-administration of a variety of psychotherapeutic technique best known as energy psychology or tapping.

2. Description of the Prior Art

Specific energy points on the body have been identified by Eastern cultures and medicine, and more recently studied and in some cases validated and used by Western culture. These points, known as meridians and chakras, are used in acupuncture, acupressure and other physical therapies and alternative medicines.

Meridians were studied by early Chinese physicians nearly 5,000 to 7,000 years ago. These physicians believed there is an energy network traversing just below the surface of the skin, which works in harmony with the body's circulatory, nervous, muscular, digestive, genitourinary and all other systems of the body. The energy, known as "chi" or "qi", flows through the body through pathways called meridians, which correspond to the body's main organs. "Chi" flows continuously from one meridian to another. A break in the flow of chi is an indication of imbalance, which causes the body's organs or tissues to function poorly. For like reason, illness is caused by disturbances in or blockage of "chi" through the body's meridians.

The chakras came to be an integral part of yoga philosophy in the non-dual Tantric tradition, which arose in the 7th century and espoused the belief that the mind and the body are intrinsically linked. The human body contains seven primary chakra points, each point relating to a specific part of the body, to specific emotions, and to specific mental and spiritual concerns. Illnesses and pain are caused by an imbalance in the chakra itself, from an emotional or spiritual cause, which then manifests into a physical ailment.

Over the past twenty years there has developed a specie of psychological technique for the treatment of psychological and emotional disturbances, and schools concerning themselves with these techniques, which center around tapping specific meridian and chakra points on the body. These techniques and schools are variously and progressively known as "Thought Field Therapy" or "TFT", "Emotional Freedom Techniques" or "EFT", and more generally as "Energy Psychology", "Tapping Therapy" and "Meridian Therapies". These psychotherapeutic techniques provide a method that, when applied to an emotional problem or disturbance that an individual is attuned to, can eliminate the disturbance and overcome the negative emotions emanating there from.

Modern practitioners and therapists in the field of energy psychology stimulate by tapping these meridian and chakra points, sometimes according to learned sequences or codes, and other times more generally according to a group of associated points, during times of psychological and emotional discomfort or disturbance, in order to effectively treat the discomfort and the underlying condition giving rise to the discomfort or disturbance. Certain meridian and chakra points are particularly effective in addressing specific types of emotional discomfort and specific psychological conditions. The various tapping therapy techniques are well known and understood, and a fair variety of such techniques are described in publicly available literature. Although this literature can teach a person the tapping theories and techniques, it takes practice and experience to become accurate and proficient in art of energy psychology or tapping.

To obtain full benefit of the energy psychology techniques, the subject needs to learn to stimulate his or her own meridian and chakra points through tapping. The person is typically taught where to tap, how to tap, and in some cases in what order to tap, the meridian and chakra points. After a few minutes of tapping specific meridian and chakra points, or a group of such points, the emotional discomfort is released and the person begins to reflect a new and positive emotion. The new emotion is outwardly manifested through the subject's changed body language or other expression. For example, if the subject is a child who harbors a fear of going to school, application of the tapping psychotherapy will cause the child's fear to fade and the child will then express his or her desire to want to go to school.

Accordingly, the effectiveness of energy psychology or tapping techniques can be enhanced by the ability and efficiency with which the subject can learn and accurately apply the tapping therapy in the absence of the teacher. Teaching the techniques efficiently to children and teens is often more challenging. It is a primary object of the instant invention to provide an easy, efficient, effective and enjoyable method of teaching energy psychology or tapping, particularly to children and teens.

Currently, there are training resources in the form of books, pamphlets and videotapes that offer information, guidance and training in energy psychology and tapping therapy and the implementation of these techniques. While primarily intended to educate and train the therapist, these same resources can be employed by the therapist, practitioner, parent or other adult to acquaint the subject with the technique and with how the subject can use the technique without the teacher's oversight. Textual training resources have limitations, particularly among those with limited reading comprehension. While audiovisual materials may be able to address the needs of the young and learning challenged, learning by doing is generally accepted as the easiest, most efficient and enjoyable training method. Such is particularly the case with young subjects. Moreover, prepared teaching literature and audio-visual material can only teach generally, and cannot as clearly target corresponding points to specific disturbances or uncomfortable feelings. It is a further object of the present invention to provide a method of teaching the self-administration of energy psychology or tapping therapy through a learning by doing method that is easily tailored to address the specific disorders, uncomfortable feelings and negative emotional conditions.

Among the prior art are published patents that employ devices and teaching aids intended to train practitioners in the arts of hand and feet acupuncture and reflexology. These patents do not teach subject self-administration of the therapies, nor do they teach the administration of any psychotherapeutic technique capable of relieving emotional discomfort. It is a further object of the instant invention to provide a device or teaching aid that facilitates the teaching of a psychotherapeutic technique that can resolve emotional disorders and discomforts to subjects for their later self-administration.

Also described in publicly available prior art literature are dolls and other toys used by child psychotherapists to assist in the diagnosis and treatment of emotional disturbances suffered by children. These toys and dolls are manipulated by the child to illustrate feelings and express emotions. These dolls and toys are not used as a vehicle to teach a psychotherapy that the child will self-administer in the therapist's absence. It is a further object of the present invention to provide a device or teaching aid in the form of a doll or other toy that can be used for the efficient and accurate teaching of energy psychology or tapping to subjects, and particularly children and teens, for their later self-administration and self-treatment.

BRIEF SUMMARY OF THE INVENTION

The foregoing and other objects are achieved in accordance with the present invention, a novel method and device for facilitating the teaching and application of the variety of psychotherapeutic technique known as energy psychology or tapping that is particularly useful in helping children and teens resolve negative emotional conditions. The therapy is used to trigger the release of insecurity, anxiety, fear, trauma, anger, helplessness, hurt, pain, sadness, guilt, and shame, as well as a number of other uncomfortable feelings and/or psychological and emotional conditions.

The device of the invention is a toy having at least a torso and head, with markings placed thereon at locations that correspond to known meridian and chakra points. The toy may be a doll taking a human form, animal, puppet, or imaginary character. It may comprise a head and torso only, or head, torso, arms and fingers only, or head, torso, arms, fingers and legs. The markings located on the toy's body parts may be visual and/or tactile, and may alternatively appear as freckles, bumps, colored spots, fur, warts or the like.

The method of the present invention involves a psychotherapist, parent, or other adult teacher having training, experience or knowledge in the art of energy psychology or tapping, and the subject who suffers the disturbance or uncomfortable feeling. The nature and intensity of the subject's disturbance are ascertained, after which the teacher determines the meridian and chakra points, or groups of points, most appropriate to relieve the subject's disturbance or discomfort. The teacher may first stimulate the applicable meridian and chakra points on the subject by tapping the designated points or groups of points, sometimes randomly and other times in accordance with specific sequences. Alternatively, the teacher may begin by instructing the subject to stimulate the same meridian and chakra points, or group of points, on him or herself by tapping these points randomly or according to an appropriate sequence.

Instructing the subject to accurately and effectively self-administer the tapping therapy is facilitated by using the toy of the present invention. The teacher may tap the markings on the toy that correspond to those meridian and chakra points appropriate to treat the subject's disturbance. The teacher may tap the subject with the toy in these same locations and according to the same sequence. The subject may be asked by the teacher to tap the toy at the given locations or groups of locations, randomly or according to the given sequence, and/or the teacher may tap the toy at the same time as the subject taps himself or herself, in cadence, on corresponding meridian and chakra points. Finally, the subject is asked to tap him or herself at the given locations, randomly or in sequence, without the aid of the toy. These steps can be varied by the teacher, and not all steps are essential to the effective implementation of the method of the claimed invention.

Through administration of the energy psychology or tapping upon the subject by the teacher, or by the subject upon him or herself at the teacher's direction, and particularly through self-administration of the therapy by the subject without the assistance of the teacher during those times that the subject is experiencing the disorder or uncomfortable feeling, the subject's discomfort, and the underlying psychological disturbance that gave rise to the discomfort, is resolved.

The novel device and method of the present invention facilitates the efficient teaching and accurate self-application of the energy psychology or tapping techniques, and makes learning the techniques more fun for the child and teen subject.

Further objects and advantages of this invention will become apparent from consideration of the drawings and ensuing description.

DETAILED DESCRIPTION

Figure 1:
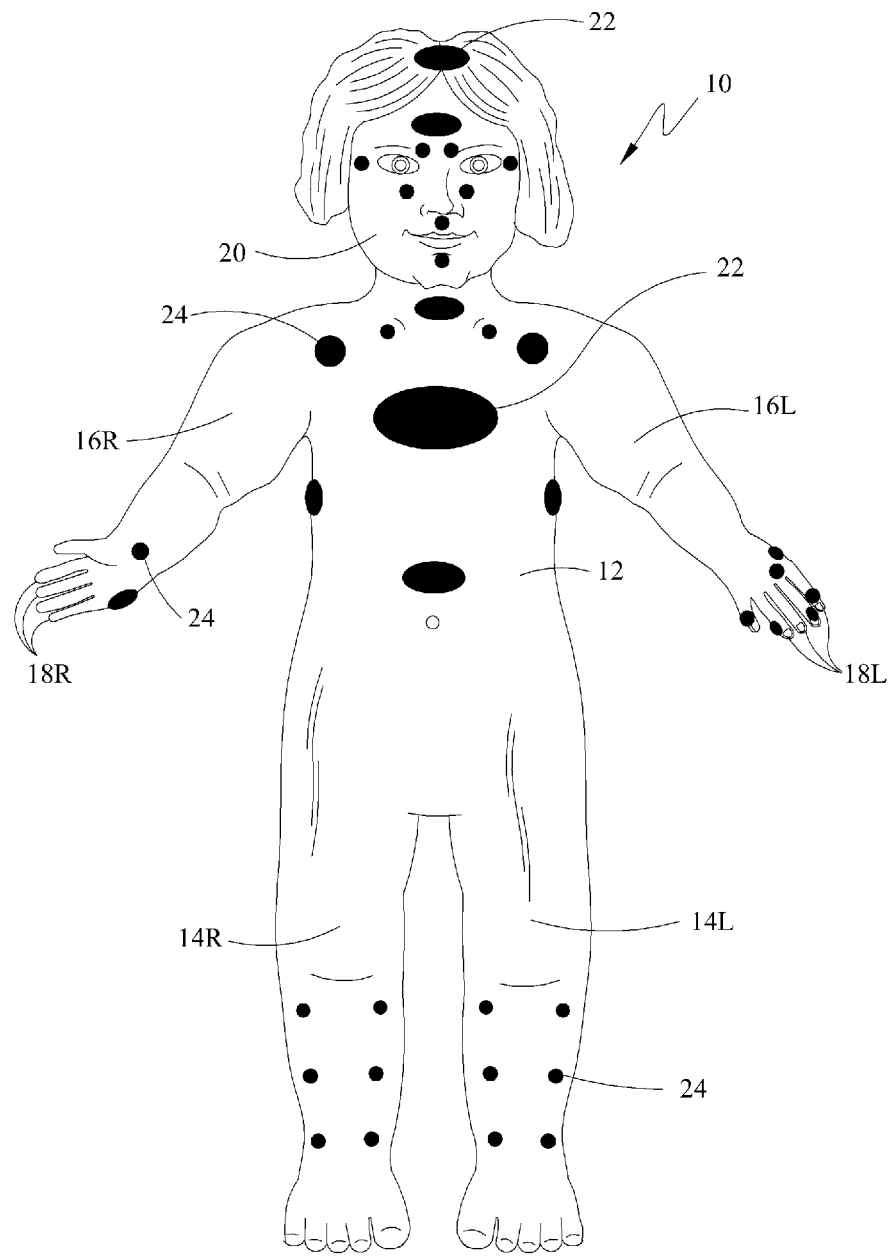
FIG. 1 is a front view of the novel toy of the present invention in the form of a doll exhibiting markings corresponding to the location of meridian and chakra points.

A preferred embodiment 10 of the device of the present invention, in the form of a doll, is illustrated from the front in FIG. 1. Doll 10 comprises a torso 12, a pair of legs 14L and 14R, a pair of arms 16L and 16R, five left fingers 18L attached to left arm 16L, five right fingers 18R attached to right arm 16R, and head 20. Doll 10 exhibits a plurality of markings 22 corresponding to the location of chakra points, and a plurality of marks 24 corresponding to the location of meridian points.

Doll 10 can be fabricated from fabric, pliant plastic, or any other material suitable and safe for children. Chakra markings 22, and meridian marking 24, can comprise spots, bumps, dimples, warts, or other manners of marking a location on doll 10 corresponding to a location on the person. Markings 22 and 24 can be visual, or tactile, or both. Visual markings assist the subject to locate the point, and tactile markings reinforce and refine the point's location.

Chakra markings 22 and meridian markings 24 are located on the toy's body parts according to known chakra and meridian points. Each point bears a relationship to one or more emotions, energy, disturbance and well-being. These relationships, and the manner in which the points can be used to affect emotions, are well documented.

Figure 2:
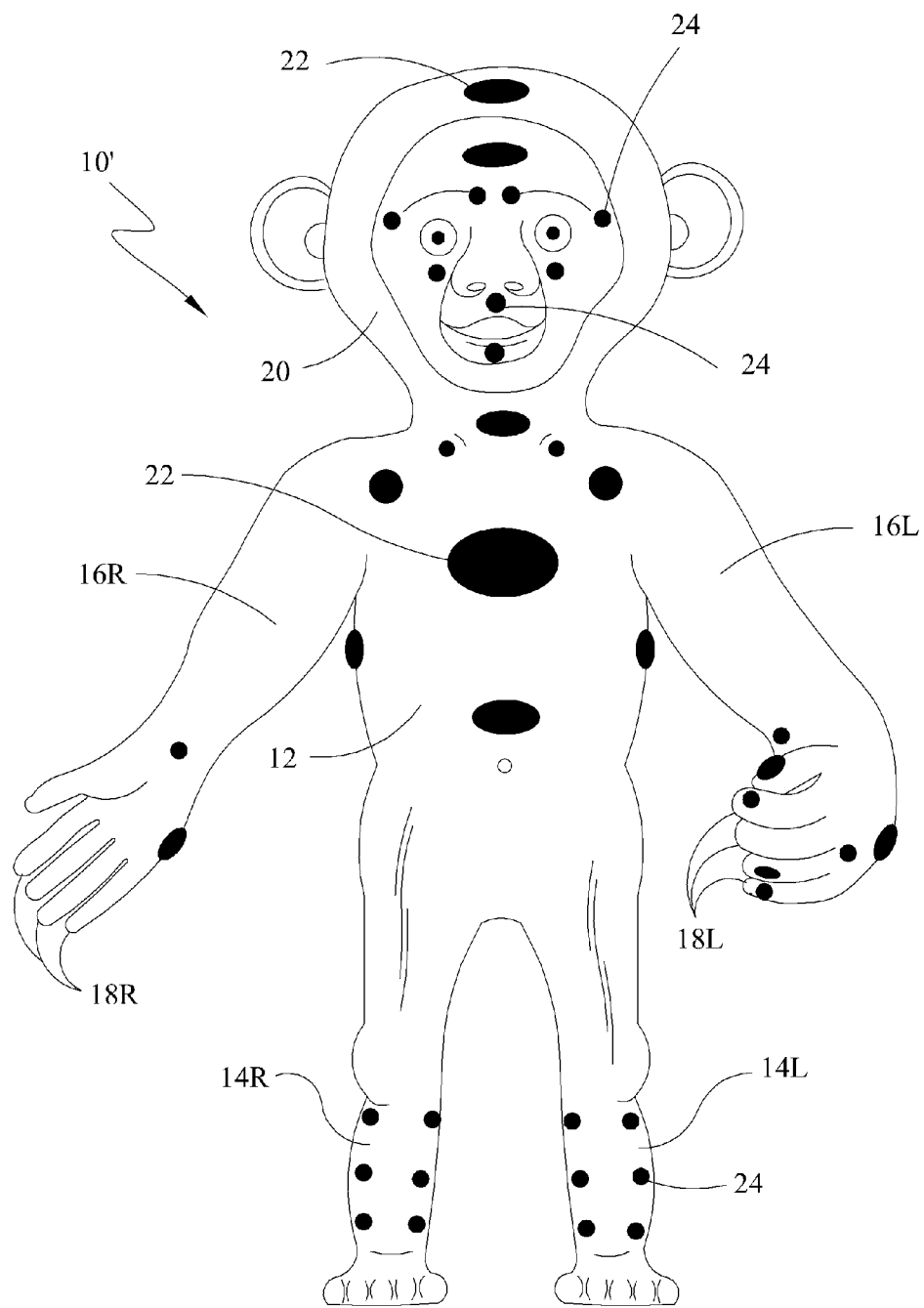
FIG. 2 is a front view of an alternative embodiment of the novel toy of the present invention in the form of an animal exhibiting spots corresponding to the location of meridian and chakra points.

An alternative embodiment 10" of the device of the present invention, this time taking the form of an animal, is depicted in FIG. 2. As with doll 10, animal 10" comprises a torso 12, a pair of legs 14L and 14R, a pair of arms 16L and 16R, five left fingers 18L attached to the animals left arm 16L, five right fingers 18R attached to animal's right arm 16R, and head 20. Also as with doll 10 illustrated in FIG. 1, animal 10" exhibits a plurality of markings 22 corresponding to the location of chakra points, and a plurality of marks 24 corresponding to the location of meridian points. Animal 10" may be made with fabric and stuffed, pliant plastic, or any other variety of material suitable for toys. Markings 22 and 24 can be represented as colored fur, spots, warts, dimples, tentacles or in other manners.

While toys taking the form of dolls and animals have been illustrated, the novel device of the present invention can equally take the form of a puppet, fanciful character or other form having body parts that allow for the mapping of meridian and chakra points in a manner corresponding to the location of the points on the human body. Also, while the embodiments illustrated in FIGS. 1 and 2 exhibit toys having body parts that include legs, arms and figures, the device of the present invention can comprise a doll, stuffed animal or other character comprising simply a head and torso, appropriately marked, without departing from the spirit and scope of the present invention.

Figure 3:
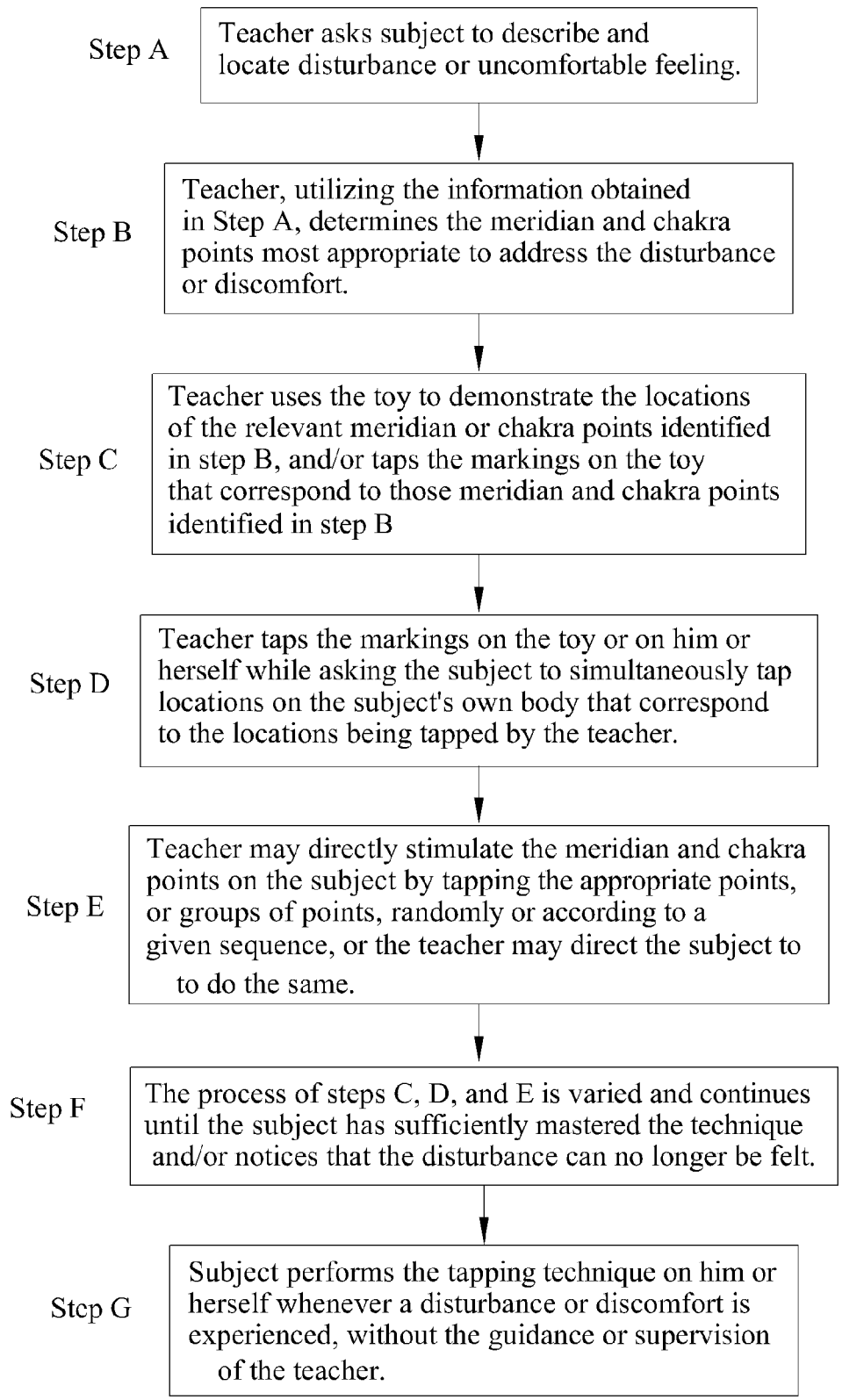
FIG. 3 is a block diagram illustrating the steps of the novel method of the present invention.

The steps of the novel method of the instant invention is illustrated by way of a block diagram in FIG. 3. In step A a teacher, who may be a therapist, parent or other adult trained in the techniques of energy psychology or tapping, ascertains the nature of the subject's disturbance or uncomfortable feeling through questioning of the subject. The subject is asked to demonstrate where in the body the disturbance or discomfort is most felt, and also to describe the nature and intensity of the disturbance or uncomfortable feeling.

In Step B the teacher, utilizing the information obtained in step A and, based upon the teacher's knowledge, experience and training, determines the meridian and chakra points most appropriate to relieve the disturbance or discomfort the subject is experiencing. The disturbance or uncomfortable feeling can be tracked as an energy field, thereby facilitating the identification of appropriate meridian and chakra points. There exists substantial literature that correlates specific meridian and chakra points to specific emotional conditions. Among the emotional conditions and negative feelings for which energy psychology or tapping therapy has been demonstrated as effective are insecurity, anxiety, fear, trauma, anger, helplessness, hurt, pain, sadness, guilt, and shame. The available literature identifies the meridian and chakra points, and/or groups of points, that address each specific disturbance or emotional condition. The available literature also provides algorithms or recipes that teach condition specific tapping sequences or codes, which can be used optionally.

Steps C through F comprise that phase of the method of the instant invention that involves teaching the subject to administer the therapy on him or herself. According to step C, the teacher uses the toy of the present invention in the manner of a map or chart to demonstrate to the subject the locations of the relevant meridian or chakra points. Alternatively or in addition, the teacher taps the markings on the toy that correspond to those meridian and chakra points identified in step B as most effective to relieve the subject's disturbance or negative feeling. In step D, the teacher taps the markings on the toy, or the meridian and chakra points on the teacher's own body, while asking the subject to simultaneously tap locations on the subject's own body that correspond to the locations the teacher is tapping, in sequence and in cadence with the teacher. According to step E, the teacher may directly stimulate these meridian and chakra points on the subject by tapping the points, or groups of points, randomly or according to a given sequence, or the teacher may direct the subject to tap him or herself at the applicable locations. In step F, steps C, D and E are varied, and repeated, until the subject has learned the locations and sequence of tapping sufficiently to administer the therapy on him or herself without the assistance or supervision of the teacher, or until the disturbance is no longer felt.

In step G, the subject administers the tapping therapy on him or herself as learned by the subject from the teacher through steps C through F. Through administration of the tapping therapy upon the subject by the teacher, and particularly through later self-administration of the tapping therapy by the subject without the assistance of the teacher during times when the subject is experiencing the disturbance or discomfort, the subject's negative feeling, and the underlying psychological disturbance that gave rise to the negative feeling, is resolved.

While FIG. 3 depicts the steps of the method of the present invention in a specific sequence, these steps can be varied, and in particular, steps C, D and E can be varied and/or repeated in any order, without departing from the scope and spirit of the present invention. Additional steps can be added, as for example having the teacher tap the subject with the toy in prescribed locations and/or sequences, before or after any of the steps C, D, and E, or in lieu of one or more of these steps. Moreover, many of the steps can be eliminated, including that step in which the teacher taps the subject, while still obtaining good results for the subject. The novel feature of the method of the present invention resides in having at least one step wherein the toy is used to teach the subject self-administration of the tapping therapy, and is not tied to any particular number or sequence of steps involving the toy.

Figure 4:
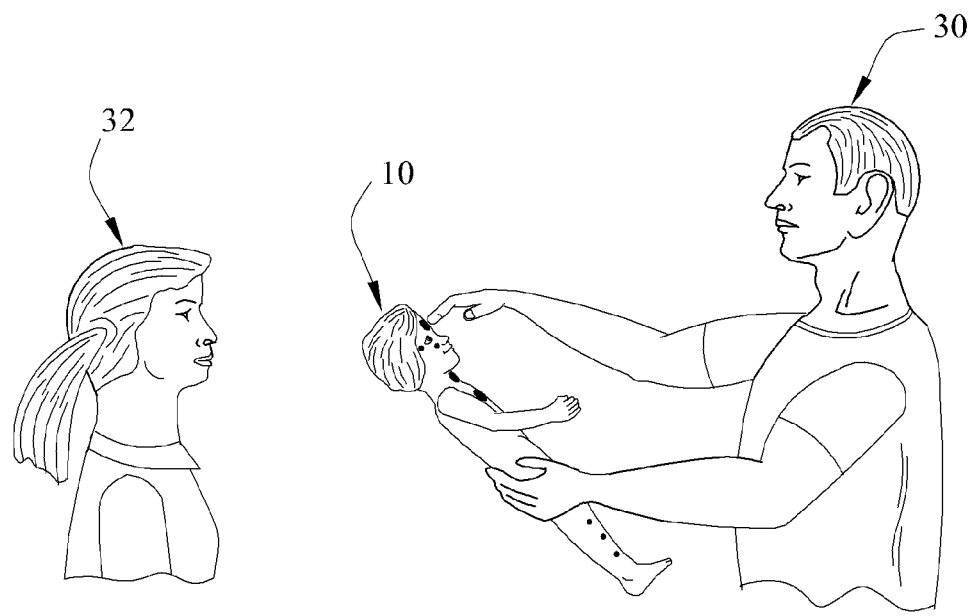
FIG. 4 is a side view of a teacher demonstrating to a subject using the doll depicted in FIG. 1.
Figure 5:
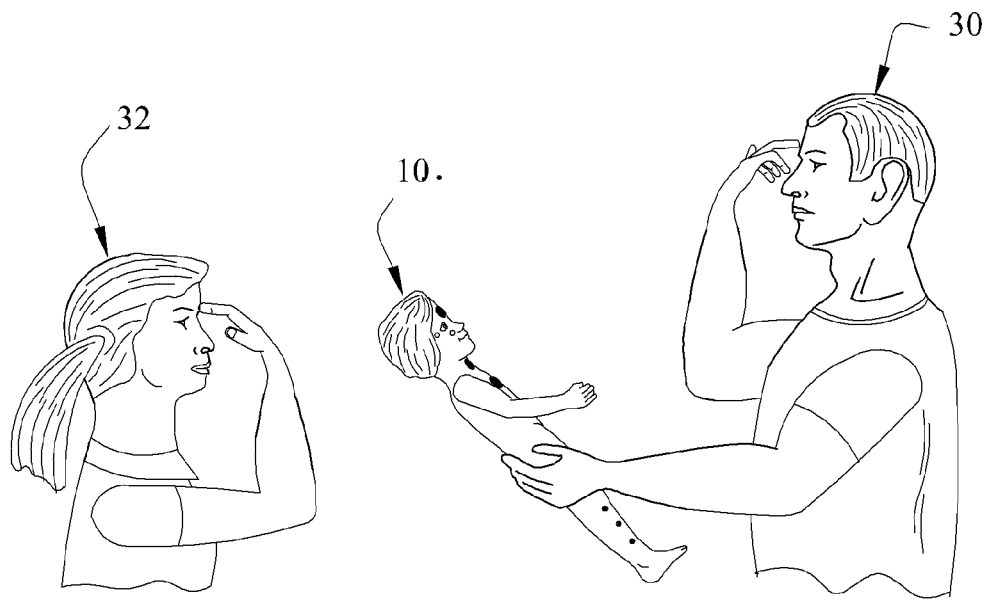
FIG. 5 is a side view of a teacher and subject each tapping on their own bodies the chakra point demonstrated by the teacher in FIG. 4.

FIGS. 4 and 5 further illustrate selected phases of the method of the instant invention. In FIG. 4, doll 10 is being used by a teacher 30 to teach a subject 32 self-administration of the tapping therapy. After ascertaining the nature and intensity of subject 32's disturbance or uncomfortable feeling, and after identifying the meridian and chakra points most appropriate to relieve that disturbance or discomfort, teacher 30 demonstrates tapping these particular chakra and meridian points on doll 10 to subject 32. As shown in FIG. 4, teacher 30 is tapping on doll 10 a chakra point 22 that is located on the forehead of doll 10 while subject 32 watches. This corresponds to step C described above and in FIG. 3.

The step D described above and in FIG. 3 is depicted in FIG. 5. Still holding doll 10, teacher 30 taps the chakra point 22 located on his own forehead that corresponds to the chakra point 22 that he had tapped by way of demonstration on doll 10 in FIG. 3. At teacher 30's direction, and simultaneously and in cadence with teacher 30, subject 32 taps the same chakra point 22 located on subject 32's own forehead while watching teacher 30 tap and while viewing the applicable chakra point 22 on doll 10. The process described and depicted in FIGS. 4 and 5 is varied, and continues, until subject 32 has sufficiently mastered the tapping technique to apply the therapy to herself without the guidance and supervision of teacher 30.

SUMMARY AND SCOPE

Thus, as can be readily appreciated, the method and toy of the present invention can substantially advance the effective implementation of those psychotherapeutic techniques best known as energy psychology or tapping. Those skilled in these arts understand that these techniques are most efficacious when applied during times the emotional disturbance or discomfort is being experienced. Typically, a subject will experience the disturbance or discomfort in the absence of a therapist, parent or other adult having knowledge sufficient to apply the technique to the subject. Accordingly, teaching subjects to self-administer energy psychology or tapping therapy can provide relief, and can serve to resolve the underlying cause of an emotional disturbance or uncomfortable feeling.

The claimed method and toy greatly facilitates the easy, effective and efficient teaching of the tapping technique to subjects and, in particular, to child and teen subjects. The novel toy of the instant invention functions in the manner of a chart or map to illustrate for the subject the location of relevant meridian and chakra points, and as a model for demonstrating and practicing the tapping of these points at locations and in sequences appropriate to the disturbance or uncomfortable feeling being experienced. The novel method teaches the self-administration of tapping therapy through learning by doing, appropriate to subjects of all ages and learning abilities, and easily tailored to address specific conditions and disorders.

Because the device takes the form of a toy, it is attractive and fun for the child subject, promoting interaction between the adult and child, and encouraging the child to continue to use the technique in the teacher's absence. While well suited for children, the toy and method of the instant invention has broad reaching implications for subjects of all ages and abilities to easily identify which meridians and chakras to tap to gain relief from common emotional disturbances such as fear, trauma, anxiety, anger, sadness, hurt, and pain.

Although the description of the various embodiments of the present invention have been set forth with specificity, it is contemplated that modifications could be made without departing from the spirit and scope of the present invention. Accordingly, the scope of the invention should be determined by the appended claims and their legal equivalents, rather than with reference to any particular example, embodiment or illustration.

The invention claimed is:

1. A method of teaching the self-administration of energy psychology or tapping therapy to relieve a disturbance or discomfort comprising the steps of:
   (a) ascertaining the nature and intensity of a subject's disturbance or discomfort;
   (b) determining in accordance with known teachings the meridian points most appropriate to relieve the disturbance or discomfort; and
   (c) teaching said subject to self-administer said therapy using a toy having at least a head and torso exhibiting indicia that correspond to known meridian points on the human body, said teaching step comprising the further steps of:
   (1) demonstrating said therapy by tapping said indicia on said toy corresponding to said meridian points identified as most appropriate to relieve said disturbance or discomfort;
   (2) demonstrating said therapy on said subject by tapping said meridian points identified as most appropriate to relieve said disturbance or discomfort;
   (3) stimulating said meridian points on said subject by tapping said points with said toy;
   (4) directing said subject to tap said indicia on said toy that correspond to said meridian points; and
   (5) directing said subject to tap in sequence and cadence said meridian points on said subject's own body at the same time as said teacher taps said indicia on said toy corresponding to said same meridian points.

2. The method of claim 1 wherein said toy further comprises arms each having five fingers and wherein said arms and fingers also exhibit indicia that correspond to known meridian points on the human body.

3. The method of claim 1 wherein said toy further comprises legs and wherein said legs also exhibit indicia that corresponds to known meridian points on the human body.

4. The method of claim 1 wherein said indicia are visual.

5. The method of claim 1 wherein said indicia are tactile.

6. The method of claim 1 wherein the toy is selected from a group comprising dolls, animals, fanciful characters and puppets.

7. The method of claim 1 wherein the indicia are selected from a group comprising colors, spots, freckles, dimples, bumps, fur, warts, calluses and tentacles.

* * * * *